US010163263B2

(12) United States Patent  (10) Patent No.: US 10,163,263 B2
Zhu et al.  (45) Date of Patent: Dec. 25, 2018

(54) USING IMAGE CONTENT TO FACILITATE NAVIGATION IN PANORAMIC IMAGE DATA

(71) Applicant: Google LLC, Mountain View, CA (US)

(72) Inventors: Jiajun Zhu, Palo Alto, CA (US); Daniel Joseph Filip, San Jose, CA (US); Luc Vincent, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/460,727

(22) Filed: Mar. 16, 2017

(65) Prior Publication Data

US 2017/0186229 A1  Jun. 29, 2017

Related U.S. Application Data

(63) Continuation of application No. 14/584,183, filed on Dec. 29, 2014, now Pat. No. 9,632,659, which is a
(Continued)

(51) Int. Cl.
*G06T 19/00* (2011.01)
*G06T 15/06* (2011.01)
(Continued)

(52) U.S. Cl.
CPC ........ *G06T 19/003* (2013.01); *G06F 3/04815* (2013.01); *G06T 3/4038* (2013.01);
(Continued)

(58) Field of Classification Search
USPC ........................................ 345/427, 419, 426
See application file for complete search history.

(56) References Cited

U.S. PATENT DOCUMENTS 5,594,844 A  1/1997  Sakai et al.
5,737,533 A  4/1998  de Hond
(Continued)

FOREIGN PATENT DOCUMENTS

CN  101055494 A  10/2007
CN  101090460 A  12/2007
(Continued)

OTHER PUBLICATIONS

International Preliminary Report on Patentability, dated Sep. 10, 2010, International Patent Application No. PCT/US2009/001216, The International Bureau of WIPO, Geneva, Switzerland, 11 pages.
(Continued)

*Primary Examiner* — Kimbinh T Nguyen
(74) *Attorney, Agent, or Firm* — Lerner, David, Littenberg, Krumholz & Mentlik, LLP

(57) ABSTRACT

The technology uses image content to facilitate navigation in panoramic image data. Aspects include providing a first image including a plurality of avatars, in which each avatar corresponds to an object within the first image, and determining an orientation of at least one of the plurality of avatars to a point of interest within the first image. A viewport is determined for a first avatar in accordance with the orientation thereof relative to the point of interest, which is included within the first avatar's viewport. In response to received user input, a second image is selected that includes at least a second avatar and the point of interest from the first image. A viewport of the second avatar in the second image is determined and the second image is oriented to align the second avatar's viewpoint with the point of interest to provide navigation between the first and second images.

20 Claims, 11 Drawing Sheets

Related U.S. Application Data continuation of application No. 13/605,635, filed on Sep. 6, 2012, now Pat. No. 8,963,915, which is a continuation of application No. 12/038,325, filed on Feb. 27, 2008, now Pat. No. 8,525,825.

(51) Int. Cl.
   *G06F 3/0481* (2013.01)
   *G06T 3/40* (2006.01)
   *G06T 17/00* (2006.01)

(52) U.S. Cl.
   CPC .............. *G06T 15/06* (2013.01); *G06T 17/00* (2013.01); *G06T 19/00* (2013.01); *G06T 2200/32* (2013.01)

(56) References Cited

U.S. PATENT DOCUMENTS

| | | | |
|---|---|---|---|
| 6,009,190 A | 12/1999 | Szeliski et al. | |
| 6,111,582 A * | 8/2000 | Jenkins | G06T 15/40 345/421 |
| 6,157,747 A | 12/2000 | Szeliski et al. | |
| 6,256,043 B1 | 7/2001 | Aho et al. | |
| 6,308,144 B1 | 10/2001 | Bronfeld et al. | |
| 6,346,938 B1 * | 2/2002 | Chan | G06F 3/04815 345/419 |
| 6,999,078 B1 | 2/2006 | Akerman et al. | |
| 7,096,428 B2 * | 8/2006 | Foote | G06F 3/04815 707/E17.018 |
| 7,161,604 B2 | 1/2007 | Higgins et al. | |
| 7,336,274 B2 | 2/2008 | Kida | |
| 7,353,114 B1 | 4/2008 | Rohlf et al. | |
| 7,570,261 B1 | 8/2009 | Edecker et al. | |
| 7,698,336 B2 | 4/2010 | Nath | |
| 7,712,052 B2 | 5/2010 | Szeliski et al. | |
| 7,746,376 B2 | 6/2010 | Mendoza et al. | |
| 7,843,451 B2 | 11/2010 | Lafon | |
| 7,882,286 B1 | 2/2011 | Natanzon et al. | |
| 7,933,897 B2 | 4/2011 | Jones et al. | |
| 7,966,563 B2 | 6/2011 | VanBree | |
| 7,990,394 B2 | 8/2011 | Vincent et al. | |
| 8,072,448 B2 | 12/2011 | Zhu et al. | |
| 8,319,952 B2 | 11/2012 | Otani et al. | |
| 8,392,354 B2 | 3/2013 | Salemann | |
| 8,447,136 B2 | 5/2013 | Ofek et al. | |
| 8,525,825 B2 | 9/2013 | Zhu et al. | |
| 8,525,834 B2 | 9/2013 | Salemann | |
| 8,587,583 B2 | 11/2013 | Newcombe et al. | |
| 8,624,958 B2 | 1/2014 | Mendoza et al. | |
| 8,774,950 B2 | 7/2014 | Kelly et al. | |
| 8,818,076 B2 * | 8/2014 | Shenkar | G06T 17/05 345/420 |
| 2002/0070981 A1 | 6/2002 | Kida | |
| 2003/0063133 A1 | 4/2003 | Foote et al. | |
| 2004/0196282 A1 | 10/2004 | Oh | |
| 2004/0257384 A1 | 12/2004 | Park et al. | |
| 2005/0073585 A1 | 4/2005 | Ettinger et al. | |
| 2005/0128212 A1 | 6/2005 | Edecker et al. | |
| 2005/0210415 A1 | 9/2005 | Bree | |
| 2006/0004512 A1 | 1/2006 | Herbst et al. | |
| 2006/0050091 A1 | 3/2006 | Shoemaker et al. | |
| 2006/0132482 A1 | 6/2006 | Oh | |
| 2006/0271280 A1 | 11/2006 | O'Clair | |
| 2007/0030396 A1 | 2/2007 | Zhou et al. | |
| 2007/0070069 A1 | 3/2007 | Samarasekera et al. | |
| 2007/0076920 A1 | 4/2007 | Ofek | |
| 2007/0143345 A1 | 6/2007 | Jones et al. | |
| 2007/0208719 A1 | 9/2007 | Tran | |
| 2007/0210937 A1 | 9/2007 | Smith et al. | |
| 2007/0250477 A1 | 10/2007 | Bailly | |
| 2007/0273558 A1 * | 11/2007 | Smith | G08G 1/0962 340/995.1 |
| 2007/0273758 A1 | 11/2007 | Mendoza et al. | |
| 2008/0002916 A1 | 1/2008 | Vincent et al. | |
| 2008/0033641 A1 | 2/2008 | Medalia | |
| 2008/0106593 A1 | 5/2008 | Arfvidsson et al. | |
| 2008/0143709 A1 | 6/2008 | Fassero et al. | |
| 2008/0268876 A1 | 10/2008 | Gelfand et al. | |
| 2009/0132646 A1 | 5/2009 | Yang et al. | |
| 2009/0279794 A1 | 11/2009 | Brucher et al. | |
| 2009/0315995 A1 | 12/2009 | Khosravy et al. | |
| 2010/0076976 A1 | 3/2010 | Sotirov et al. | |
| 2010/0250120 A1 | 9/2010 | Waupotitsch et al. | |
| 2010/0257163 A1 | 10/2010 | Ohazama et al. | |
| 2010/0305855 A1 | 12/2010 | Dutton et al. | |
| 2011/0137561 A1 | 6/2011 | Kankainen | |
| 2011/0202492 A1 | 8/2011 | Salemann | |
| 2011/0254915 A1 | 10/2011 | Vincent et al. | |
| 2011/0270517 A1 | 11/2011 | Benedetti | |
| 2011/0283223 A1 | 11/2011 | Vaittinen et al. | |
| 2014/0152699 A1 * | 6/2014 | Oh | G06T 13/80 345/635 |
| 2014/0160119 A1 | 6/2014 | Vincent et al. | |
| 2014/0294263 A1 | 10/2014 | Hermosillo Valadez et al. | |
| 2015/0154796 A1 | 6/2015 | Co | |
| 2016/0148413 A1 * | 5/2016 | Oh | G06T 13/80 345/634 |

FOREIGN PATENT DOCUMENTS

| | | |
|---|---|---|
| GB | 2440197 A | 1/2008 |
| JP | 2004342004 A | 12/2004 |
| JP | 2005250560 A | 9/2005 |
| JP | 2008520052 A | 6/2008 |
| WO | 2006053271 A1 | 5/2006 |
| WO | 2007044975 A2 | 4/2007 |
| WO | 2008147561 A2 | 12/2008 |

OTHER PUBLICATIONS

Notification of the First Office Action, dated Mar. 30, 2012, Chinese Patent Application 200980114885.5, The State Intellectual Property Office of the People's, Republic of China, 7 pages (English language translation appended).

Notification of the Third Office Action, dated Feb. 25, 2013, Chinese Patent Application 200980114885.5, The State Intellectual Property Office of the People's Republic of China, 7 pages (English language translation appended).

First Office Action, dated Apr. 1, 2013, Japanese Patent Application No. 2010-548720, Japanese Patent Office, 7 pages (English language translation appended).

The State Intellectual Property Office of the People'S Republic of China, "Notification of the Second Office Action," Appln. No. 200980114885.5, dated Sep. 12, 2012, pp. 1/52-10/52 (English language translation provided—pp. 1-15).

Yang, Yang, "Research on the Virtual Reality Technology of Digital Tour System," Chinese Master's Theses Full-Text Database Information Science and Technology, Issue 5, Nov. 15, 2007, pp. 12/52-39/52.

Cobzas et al., "A Panoramic Model for Remote Robot Environment Mapping and Predictive Display," Published 2005.

Kulju et al., "Route Guidance Using a 3D City Mobile Device," Published 2002.

Kimber, et al., "FlyAbout: Spatially Indexed Panoramic Video," Proceedings of the ninth ACM international conference on Multimedia; 2001; pp. 339-347.

Lowe et al.; "Fitting Parameterized Three-Dimensional Models to Images," IEEE Transactions on Pattern Analysis and Machine Intelligence, 13, 5, May 1991; pp. 441-450.

Bay et al., "Surf: Speeded Up Robust Features;" Computer Vision-European Conference on Computer Vision 2006; Jul. 26, 2006; pp. 1-14.

Zhu et al., U.S. Appl. No. 12/014,513, filed Jan. 15, 2008, entitles Three-Dimensional Annotations for Street View Data.

Kadobayashi, R., et al., "Combined Use of 2D Images and 3D Models for Retrieving and Browsing Digital Archive Contents", Videometrics VIII, Proceeding of the SPIE—The International Society of Optical Engineering, San Jose, CA, 2005, 10 pages.

(56) References Cited

OTHER PUBLICATIONS

International Search Report and Written Opinion for International Patent Application PCT/US2009/001216, European Patent Office, Netherlands, completed Sep. 8, 2009, dated Sep. 21, 2009, 20 pages.
Snavely, Noah et al., "Photo tourism: Exploring Photo Collections in 3D," ACM Transactions on Graphics (SIGGRAPH Proceedings), 25 (3), 2006, pp. 835-846.
Web Archive Capture (Feb. 26, 2008), <http://phototour.cs.washington.edu/>.
Wei et al., "A Panoramic Image-Based Approach to Virtual Scene Modeling," Oct. 2006.
Cornells et al. "3D Urban Scene Modeling Integrating Recognition and Reoncstruction," published Oct. 2007.
Xu Huaiyu et al: "A Virtual Community Building Platform Based on Google Earth", Hybrid Intelligent Systems, 2009. HIS '09. Fifth International Conference on, IEEE, Piscataway, NJ, USA, Aug. 12, 2009, pp. 349-352, XP031529801.
U.S. Appl. No. 13/414,658, filed Jul. 3, 2012.
Notification of First Office Action for Chinese Patent Application No. 201310473478.1 dated Mar. 3, 2016.
Frueh et al. "Data Processing Algorithms for Generating Textured 3D Building Façade Meshes from laser Scans and Camera Images", Published 2004.

\* cited by examiner

USING IMAGE CONTENT TO FACILITATE NAVIGATION IN PANORAMIC IMAGE DATA

CROSS-REFERENCE TO RELATED APPLICATION

The present application is a continuation of U.S. patent application Ser. No. 14/584,183, filed Dec. 29, 2014, which is a continuation of U.S. patent application Ser. No. 13/605,635, filed Sep. 6, 2012 and which issued as U.S. Pat. No. 8,963,915 on Feb. 24, 2015, which is a continuation of U.S. patent application Ser. No. 12/038,325, filed Feb. 27, 2008 and which issued as U.S. Pat. No. 8,525,825 on Sep. 3, 2013, all of which are incorporated herein by reference.

FIELD OF THE INVENTION

The present invention relates to navigating between panoramic images.

BACKGROUND OF THE INVENTION

Computer systems exist that include a plurality of panoramic images geo-coded to locations on a map. To navigate between neighboring panoramic images, the user may select a button on a map and a new neighboring panoramic image may be loaded and displayed. Although this technique has benefits, jumping from one image to the next image can be distracting to a user. Accordingly, new navigation methods and systems are needed.

BRIEF SUMMARY

The present invention relates to using image content to facilitate navigation in panoramic image data. In a first embodiment, a computer-implemented method for navigating in panoramic image data includes: (1) determining an intersection of a ray and a virtual model, wherein the ray extends from a camera viewport of an image and the virtual model comprises a plurality of facade planes; (2) retrieving a panoramic image; (3) orienting the panoramic image to the intersection; and (4) displaying the oriented panoramic image.

In a second embodiment, a method for creating and displaying annotations includes (1) creating a virtual model from a plurality of two-dimensional images; (2) determining an intersection of a ray and the virtual model, wherein the ray extends from a camera viewport of a first image; (3) retrieving a panoramic image; (4) orienting the panoramic image to face the intersection; and (5) displaying the panoramic image.

In a third embodiment, a system creates and displays annotations corresponding to a virtual model, wherein the virtual model was created from a plurality of two-dimensional images. The system includes a navigation controller that determines an intersection of a ray, extended from a camera viewport of a first image, and a virtual model, retrieves a third panoramic image and orients the third panoramic image to face the intersection. The virtual model comprises a plurality of facade planes.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 1 is a diagram that illustrates using image content to facilitate navigation in panoramic image data according to an embodiment of the present invention.

FIGS. 2A, 2B, 2C, and 2D are diagrams that demonstrate ways to facilitate navigation in panoramic image data in greater detail.

Figure 4:
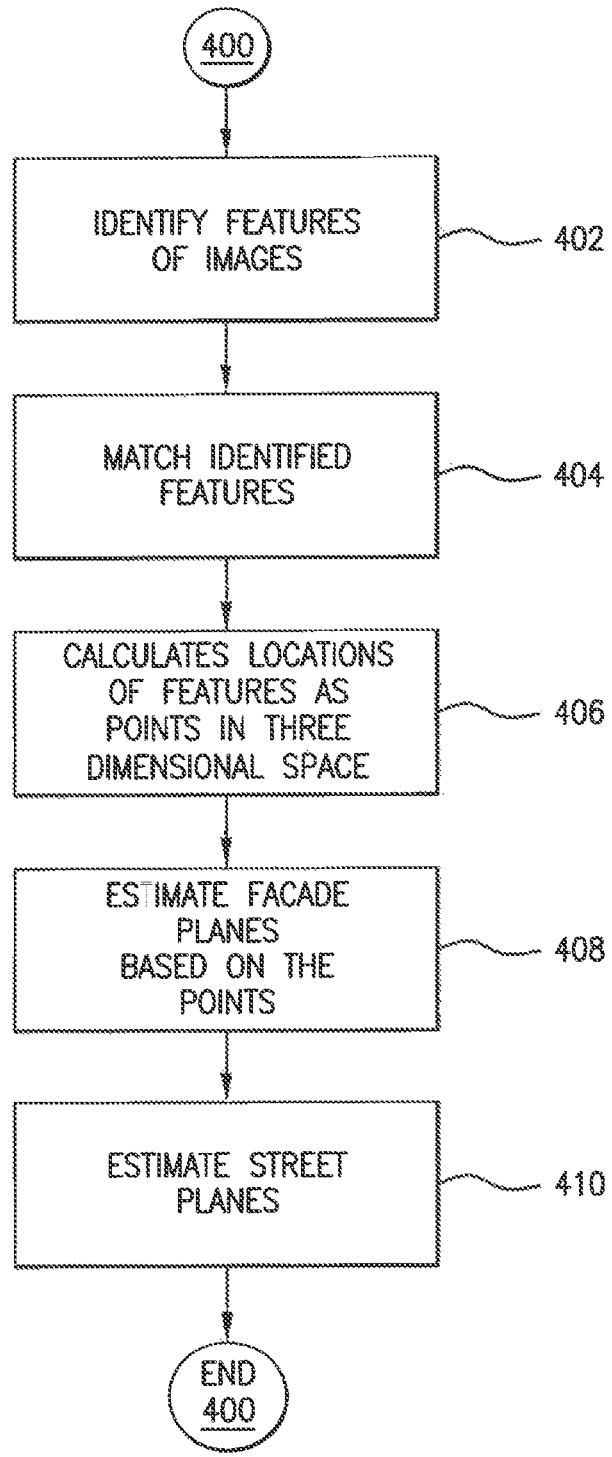
FIG. 4 is a flowchart that illustrates a method for creating a virtual model from image data according to an embodiment of the present invention.
Figure 5A:
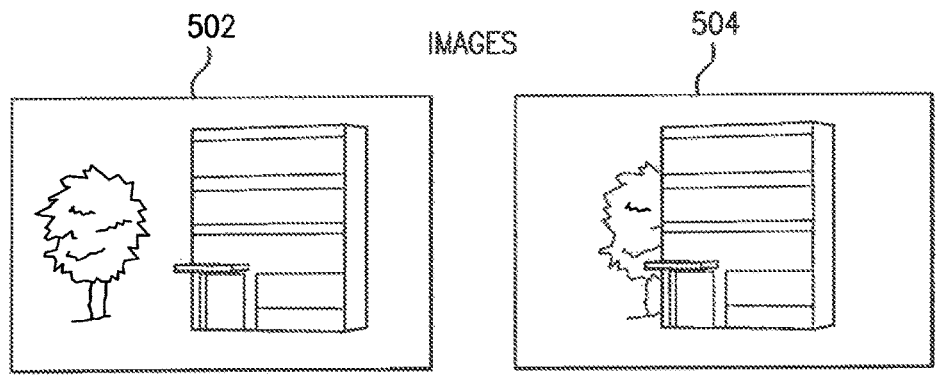
Figure 5B:
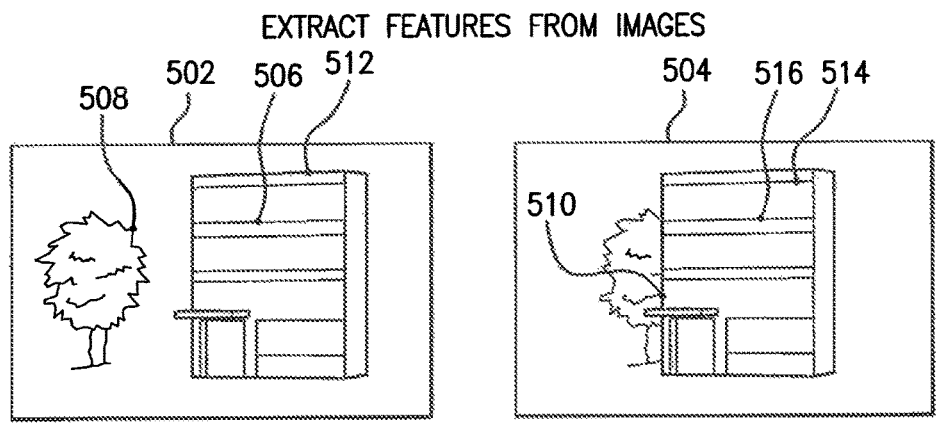
Figure 5C:
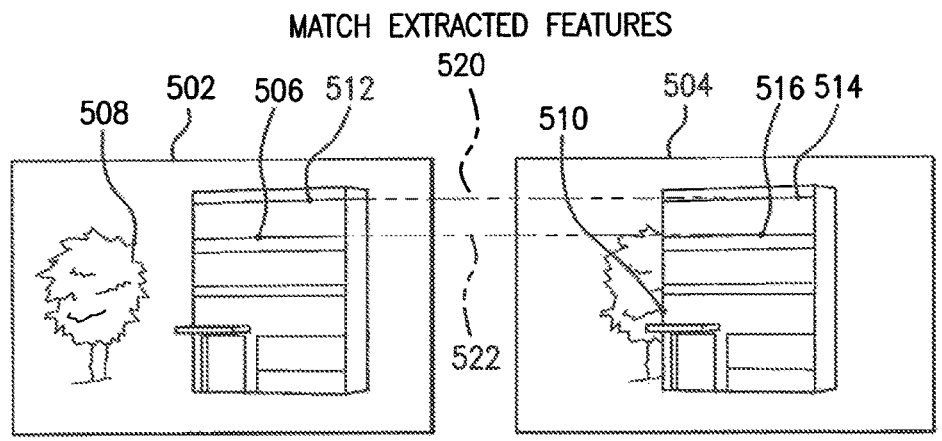

FIGS. 5A, 5B, and 5C are diagrams that illustrate finding matching features according to the method of FIG. 4.

Figure 6:
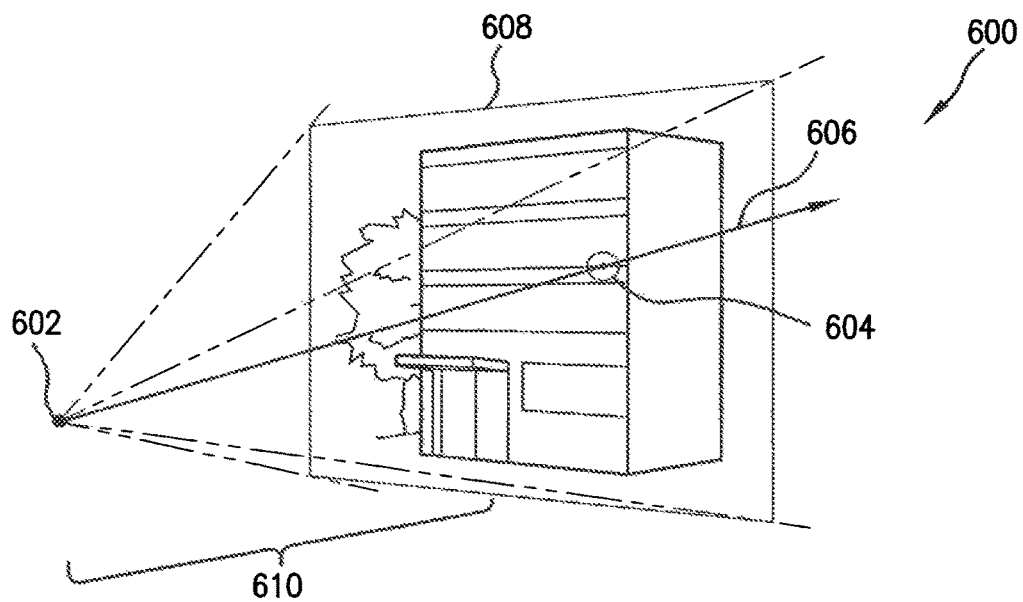
Figure 7:
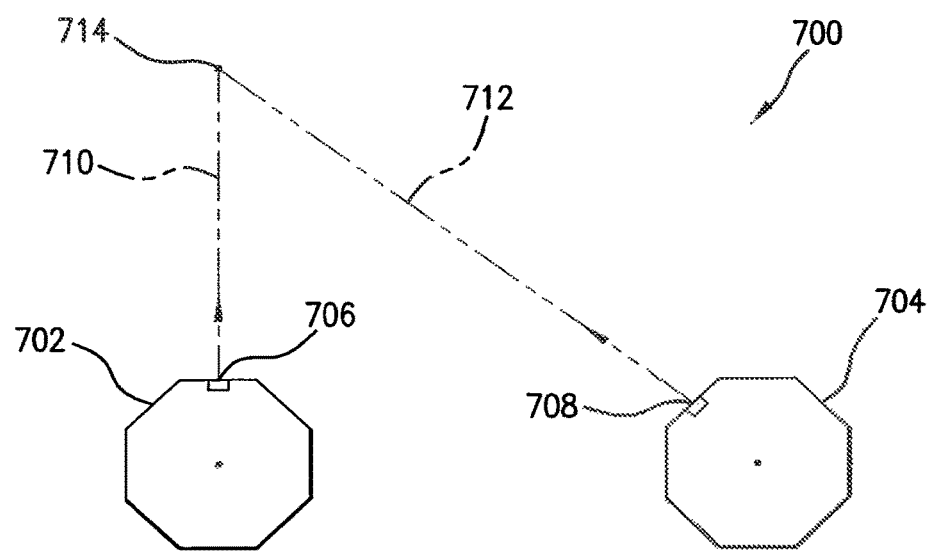

FIGS. 6-7 are diagrams that illustrate determining a point based on a pair of matching features according to the method in FIG. 4.

Figure 8A:
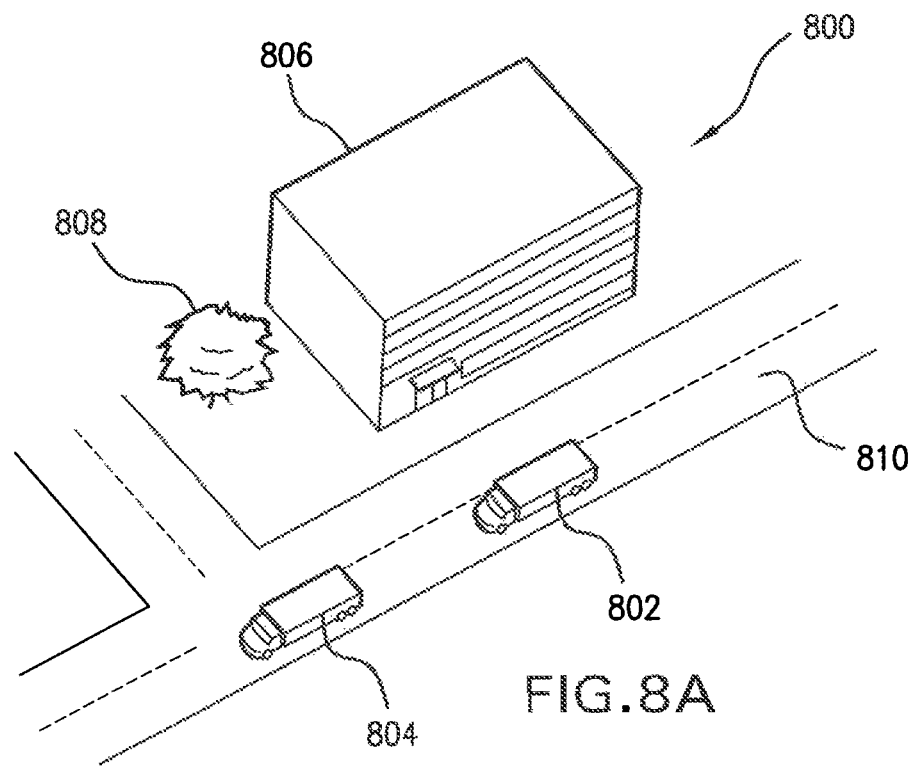
Figure 8B:
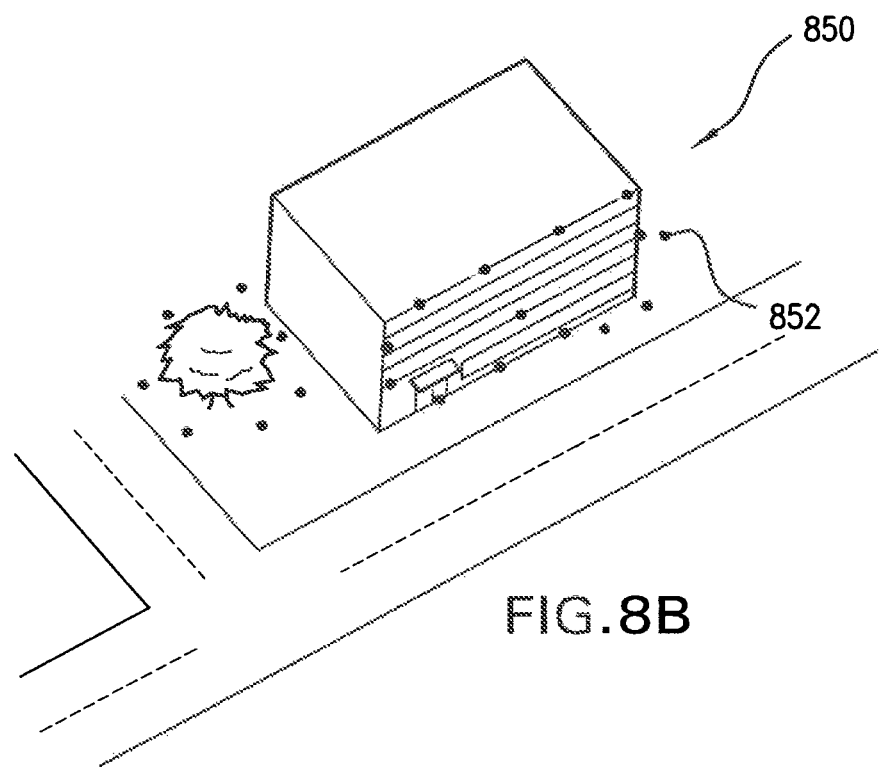

FIGS. 8A and 8B are diagrams that illustrate a plurality of points determined according to the method of FIG. 4.

Figure 9A:
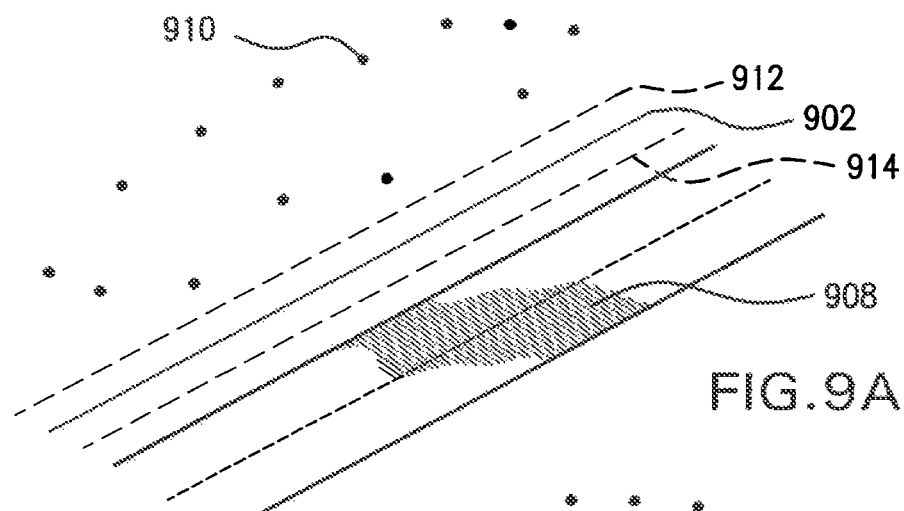
Figure 9B:
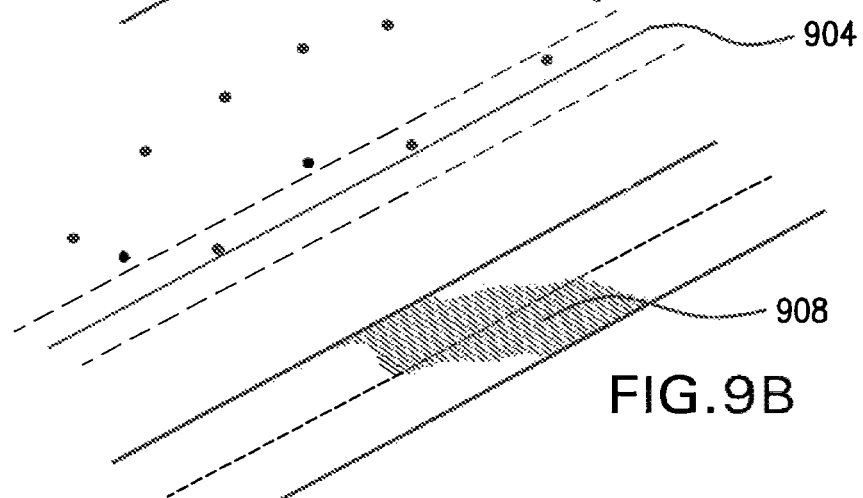
Figure 9C:
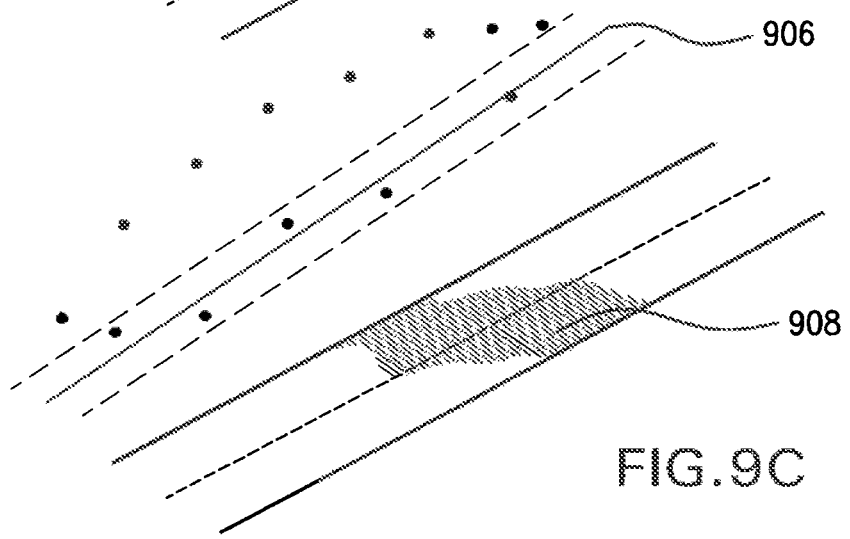

FIGS. 9A, 9B, and 9C are diagrams that illustrate determining a surface based on a plurality of points according to the method of FIG. 4.

Figure 10:
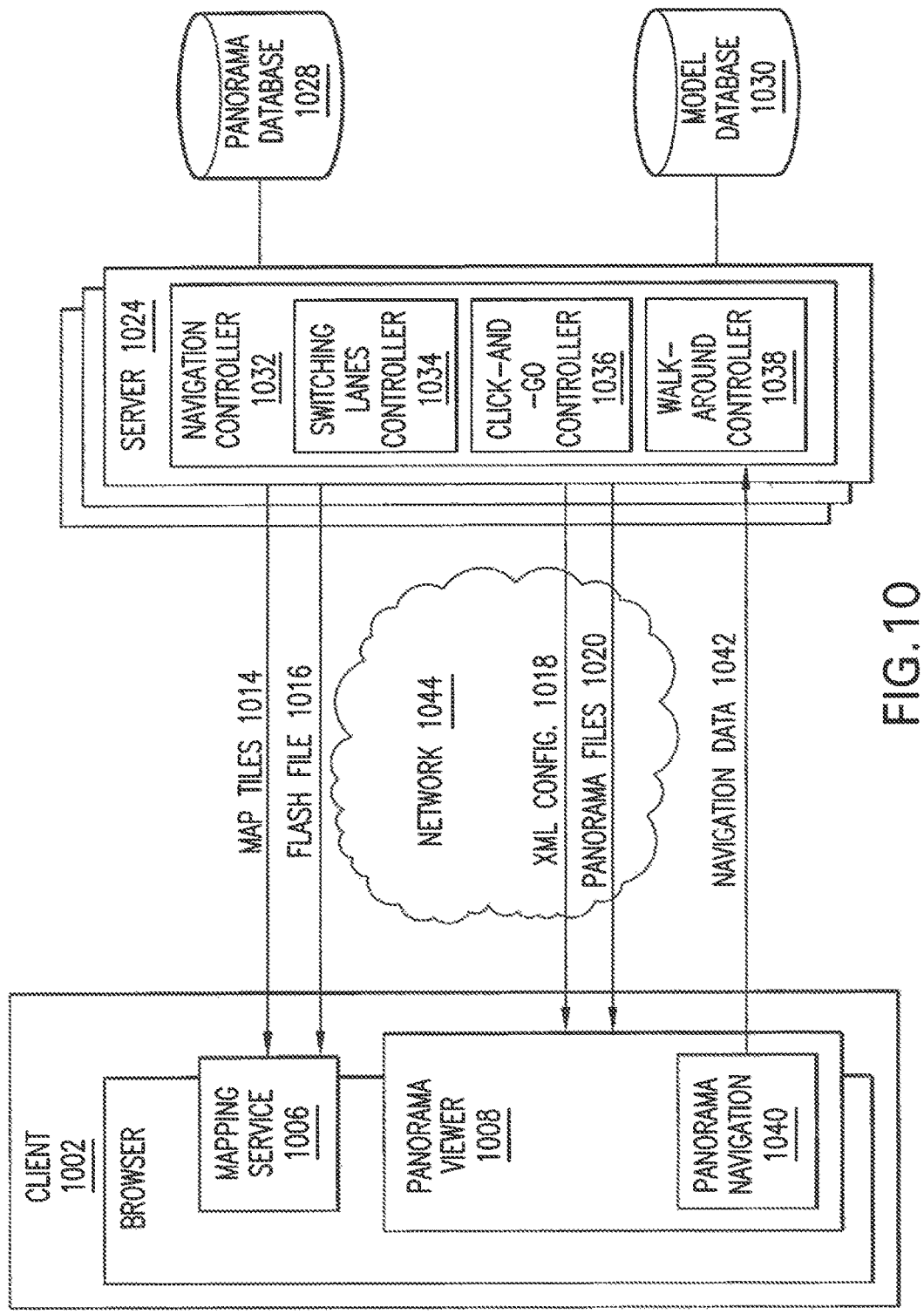

FIG. 10 is a diagram that shows a system for using a virtual model to navigate within image data according to an embodiment of the invention.

Figure 11:
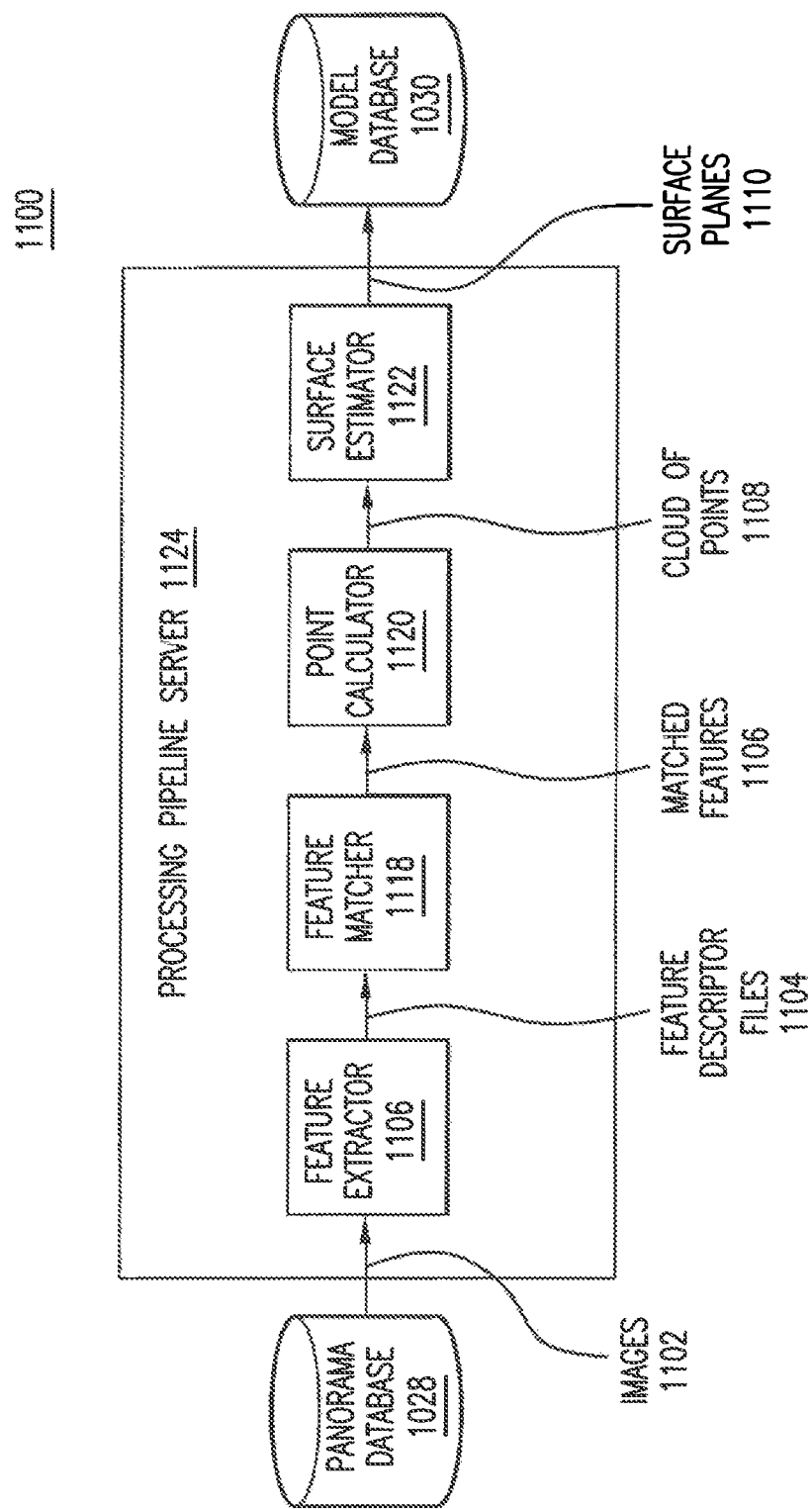

FIG. 11 is a diagram that shows a system for creating a virtual model from image data according to an embodiment of the invention.

The drawing in which an element first appears is typically indicated by the leftmost digit or digits in the corresponding reference number. In the drawings, like reference numbers may indicate identical or functionally similar elements.

DETAILED DESCRIPTION OF THE INVENTION

The present invention relates to using image content to facilitate navigation in panoramic image data. In the detailed description of the invention that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As described herein, embodiments of the present invention enables users to navigate between panoramic images using image content. In one embodiment, a model is created representing the image content. A user may select an object contained in a first panoramic image. The location of the object is determined by projection the user's selection onto the model. A second panorama is selected and/or oriented according to that location. In this way, embodiments of this invention enable users to navigate between the first and second panorama using image content.

Figure 1:
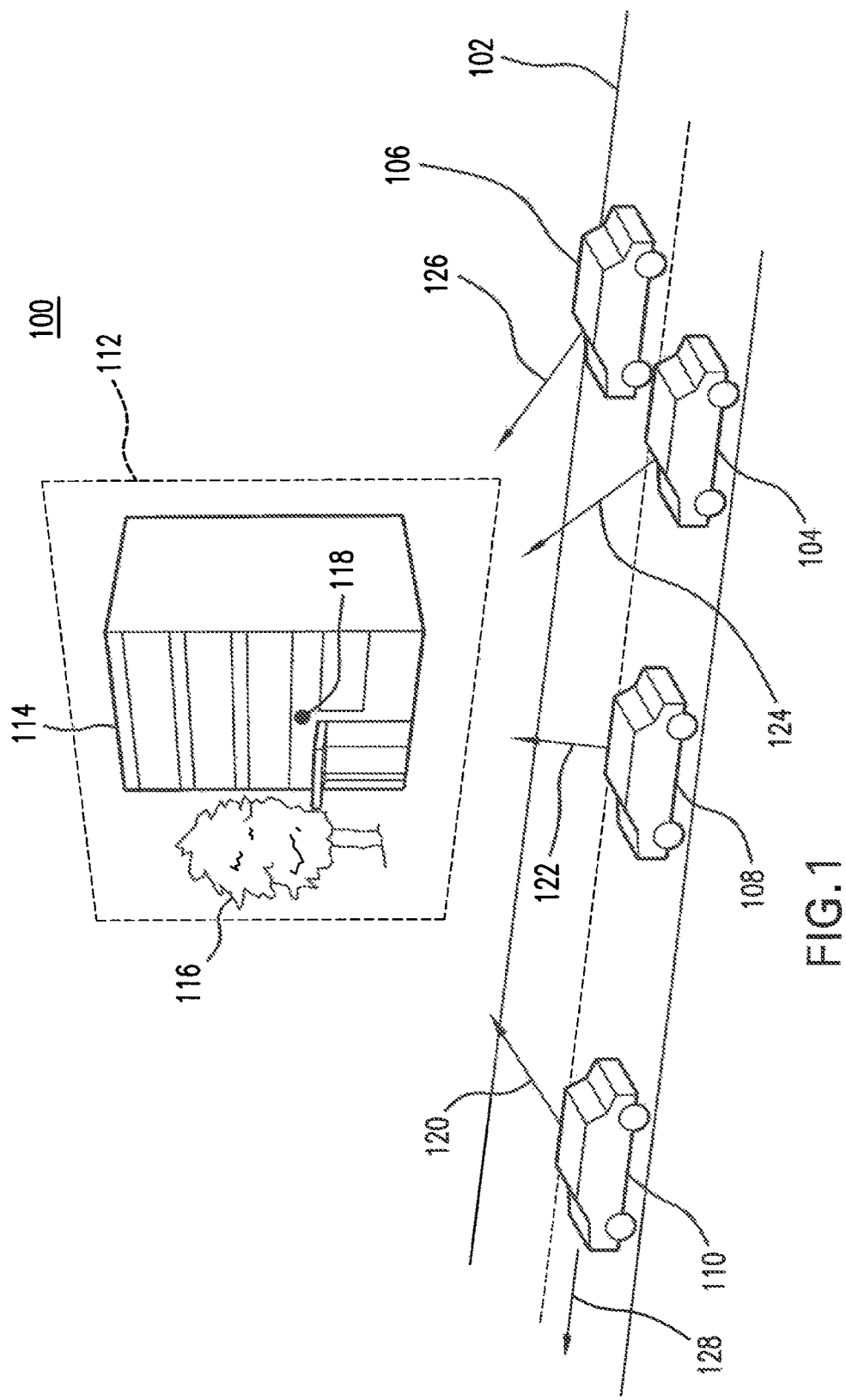

FIG. 1 is a diagram 100 that illustrates using image content to facilitate navigation in panoramic image data according to an embodiment of the present invention. Diagram 100 shows a building 114 and a tree 116. The locations of building 114 and tree 116 are approximated by a virtual model 112. Virtual model 112 may be a three dimensional model generated using images taken of building 114 and tree 116, as is described below. A street 102 runs alongside building 114 and tree 116.

Several avatars (e.g., cars) 104, 106, 108, and 110 are shown at locations on street 102. Each avatar 104, 106, 108, and 110 has an associated panoramic image geo-coded to the avatar's location on street 102. The panoramic image may include content 360 degrees around the avatar. However, only a portion of the panorama may be displayed to a user at a time, for example, through a viewport. In diagram 100, the portion of the panorama displayed to the user is shown by the each avatar's orientation. Avatars 104, 106, 108, and 110 have orientations 124, 126, 122, 120 respectively.

Avatar 104 has orientation 124 facing a point 118. Avatar 104's viewport would display a portion of a panorama geo-coded to the location of the avatar 104. The portion of the panorama displayed in the viewport would contain a point 118. Embodiments of the present invention use virtual model 112 to navigate from the position of avatar 104 to the positions of avatar 106, 108, and 110.

In a first embodiment of the present invention, hereinafter referred to as the switching lanes embodiment, a user may navigate between lanes. The switching lanes embodiment enables a user to navigate from avatar 104's panorama to avatar 106's panorama. Avatar 106's panorama is geo-coded to a location similar to avatar 104's panorama, but in a different lane of street 102. Because the panorama is geo-coded to a different location, if avatar 104 and avatar 106 had the same orientation, then their corresponding viewports would display different content. Changing content displayed in the viewport can be disorienting to the user. The switching lanes embodiment orients avatar 106 to face point 118 on virtual model 112. In this way, the portion of the panorama displayed in avatar 106's viewport contains the same content as the portion of the panorama displayed in avatar 104's viewport. In this way, the switching lanes embodiment makes switching between lanes less disorienting.

In a second embodiment of the present invention, hereinafter referred to as the walk-around embodiment, a user may more easily view an object from different perspectives. The user may get the sense that he/she is walking around the object. The walk-around embodiment enables a user to navigate from avatar 104's panorama to avatar 108's panorama. The location of avatar 108 may be, for example, selected by the user. For example, a user may select the location of avatar 108 by selecting a location on a map or pressing an arrow button on a keyboard. Because the panorama is geo-coded to a different location, if avatar 104 and avatar 106 had the same orientation, then their corresponding viewports would display different content, and an object of interest displayed in avatar 104's viewport may not by be displayed in avatar 106's viewport. The walk-around embodiment orients avatar 108 to face point 118 on virtual model 112. In this way, the portion of the panorama displayed in avatar 106's viewport contains the same content as the portion of the panorama displayed in avatar 104's viewport. As result, the user may more easily view an object from different perspectives.

In an embodiment, a transition may be displayed to the user between avatar 104 and avatar 108. The transition may show intermediate panoramas for avatar positions between avatar 104 and avatar 108. The intermediate panoramas may be oriented to face point 118 as well.

In a third embodiment, hereinafter referred to as the click-and-go embodiment, a user may navigate to a second panoramic image at a new location according to the location of an object of a first panorama. The click-and-go embodiment enables a user to navigate from avatar 104's panorama to an avatar 110's panorama. The position of avatar 110 is the position of the closest available panorama to point 118 on virtual model 112. Point 118 may be determined according to a selection by the user in the first panorama.

In embodiments, avatar 110 may have an orientation 120 facing point 118 or a different orientation 128. Orientation 128 may be the orientation of the orientation of street 102.

By selecting avatar 110 according to point 118 on virtual model 112, the click and go embodiment uses virtual model 112 to navigate between panoramic images. As is described below, in an embodiment, virtual model 112 is generated using the content of panoramic images.

In an example, the click and go embodiment may enable a user to get a closer look at an object in the example, the user may select an object in a first panorama and a second panorama close to the object is loaded. Further, the portion of the second panorama containing the object may be displayed in the viewport. In this way, using the content of the panoramic images to navigate between panoramic images creates a more satisfying and less disorienting user experience.

In an embodiment, a panorama viewer may display a transition between avatar 104 and avatar 108. The transition may display intermediate panoramas for avatar positions between avatar 104 and avatar 108. The intermediate panoramas may be oriented to face point 118 as well.

FIGS. 2A, 2B, 2C, and 2D are diagrams that demonstrate ways to facilitate navigation in panoramic image data in greater detail.

Figure 2A:
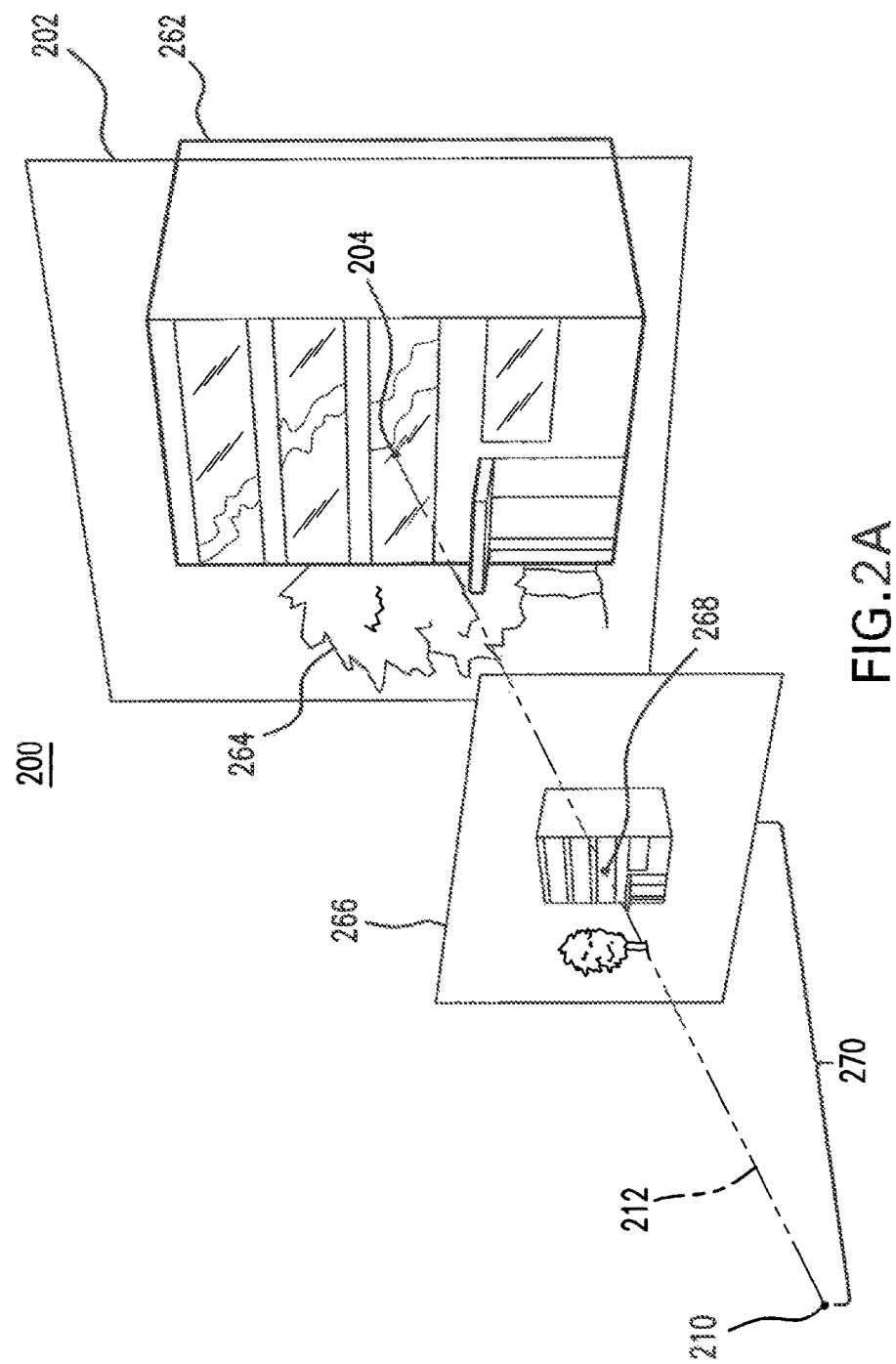

FIG. 2A is a diagram 200 that shows how a point on a model, such as point 118 in FIG. 1, may be generated. Diagram 200 shows a building 262 and a tree 264. A virtual model 202 represents building 262 and tree 264. Model 202 may be generated using image content, as is described in detail below. Diagram 200 also shows an image 266 taken of building 262 and tree 264. Image 266 may be a portion of a panoramic image taken from street level displayed to a user through a viewport. A point 268 is shown on image 266. In some embodiments, such as the switching lanes and walk-around embodiments, point 268 may be the center of image 266. In other embodiments, such as the click-and-go embodiment, point 268 may be selected by a user using an input device, such as a mouse.

A ray 212 is extended from a camera viewpoint 210 through point 268. In an example, camera viewpoint 210 may be the focal point of the camera used to take photographic image 266. In that example, the distance between image 266 and camera viewpoint 210 is focal length 270.

A point 204 is the intersection between ray 212 and virtual model 202. Point 204 may be used to navigate between street level panoramic images, as is shown in FIGS. 2B, 2C, and 2D.

Figure 2B:
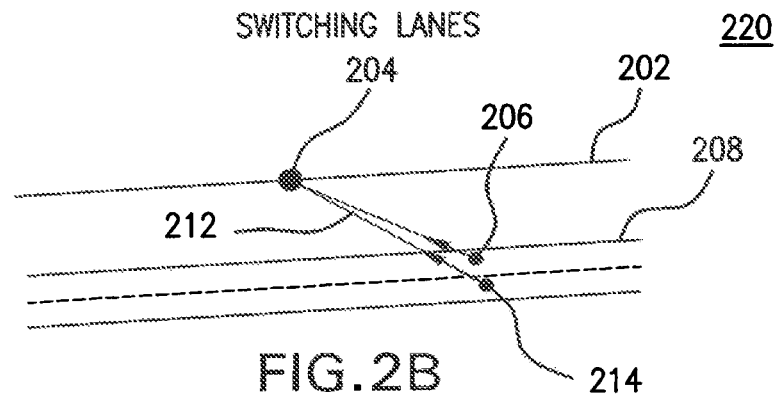

FIG. 2B is a diagram 220 that shows an example of the switching lanes embodiment. Ray 212 and point 204 on model 202 are determined using an image having a location 214 on a street 208. A panoramic image taken from location 206 close to location 214, but in a different lane of street 208, is also identified in FIG. 2B. The panoramic image having location 206 is oriented to face point 204.

Figure 2C:
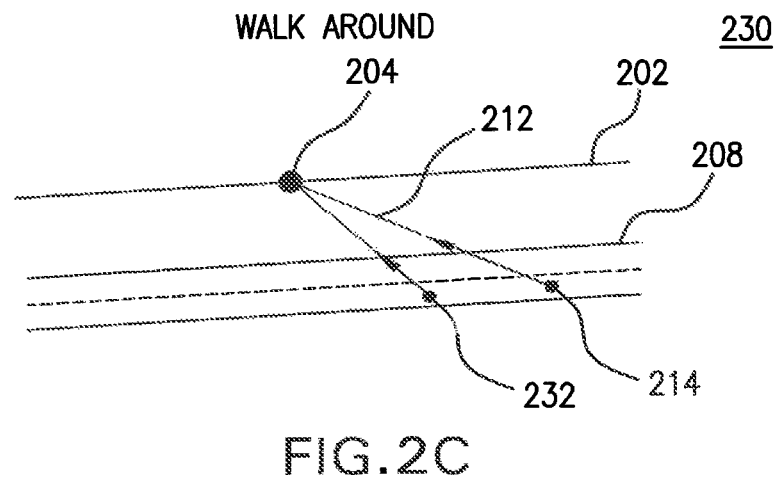
Figure 2D:
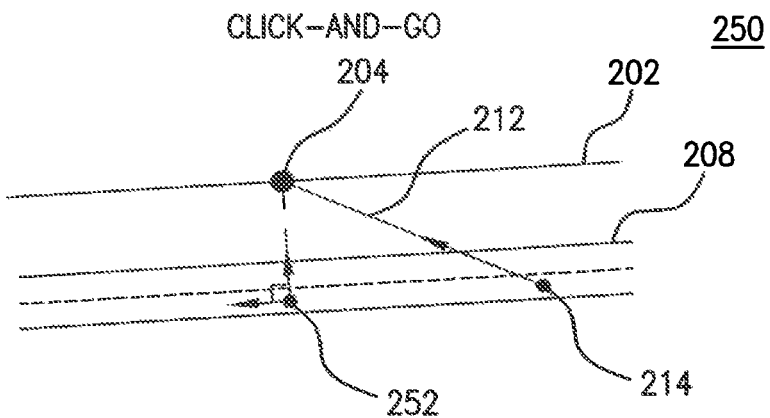

FIG. 2C is a diagram 230 that shows an example of the walk-around embodiment. Ray 212 and point 204 on model 202 are determined using an image taken from a location

214. A panoramic image having a location 232 may be selected, for example, by a user. The panoramic image having location 232 is oriented to face point 204.

FIG. 2D is a diagram 250 that shows an example of the click-and-go embodiment. Ray 212 and point 204 on model 202 are determined using an image having a location 214. A panoramic image is selected that has a location 252, close to location 204. In an example, point 204 may be normal to street 208 from a location 252, as shown in FIG. 2D. In another example, location 252 may be normal to virtual model 202 from point 204. The panoramic image having location 252 may be oriented to face point 204 or may be oriented to face the direction of street 208.

Figure 3:
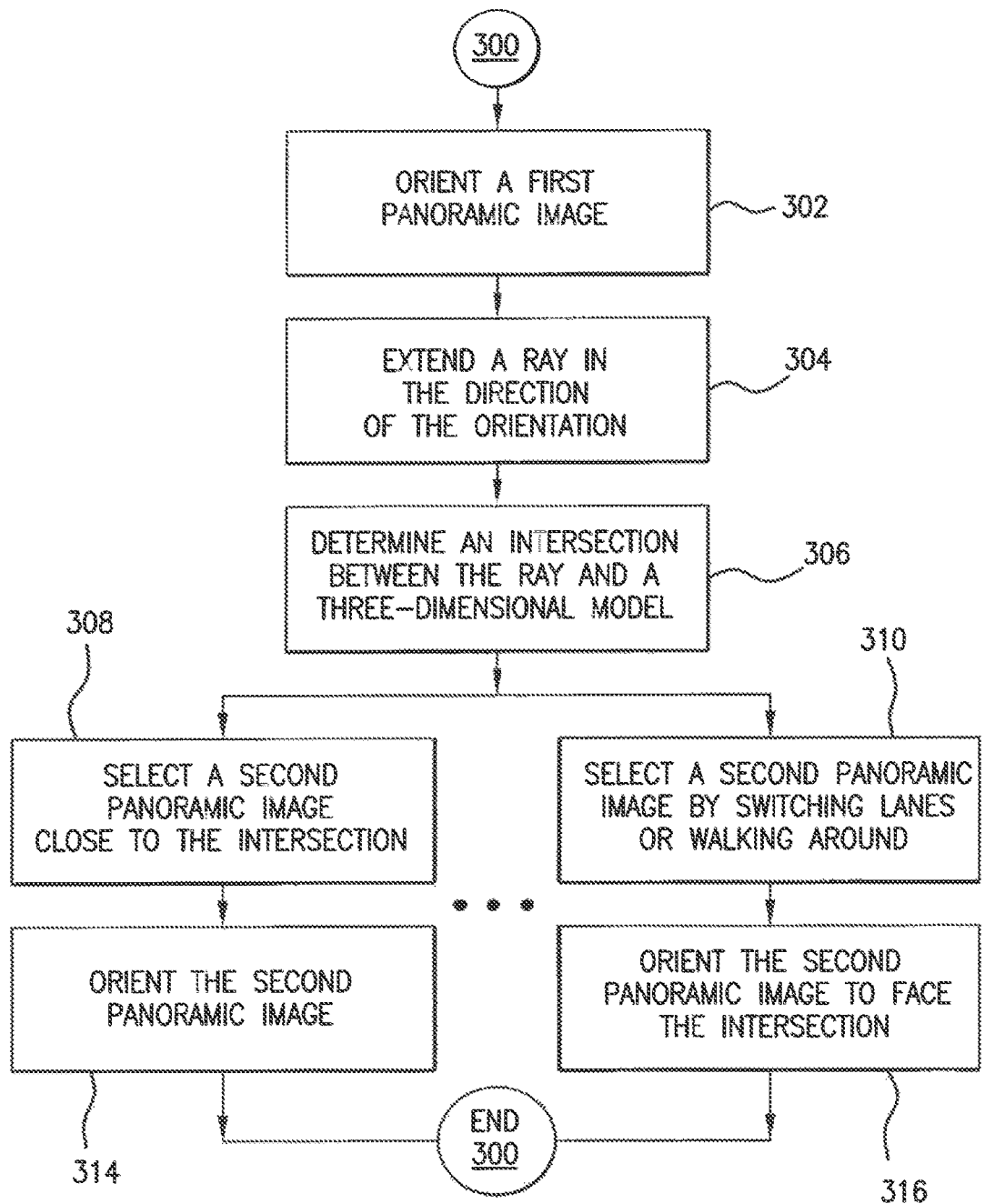
FIG. 3 is a flowchart that illustrates a method for navigating within panoramic image data according to an embodiment of the present invention.

FIG. 3 is a flowchart that demonstrates a method 300 for navigating within panoramic image data according to an embodiment of the present invention. Method 300 starts with orienting a first panoramic image at step 302. At step 304, a ray is extended in the direction of the orientation of the first panoramic image, as described for example with respect to FIG. 2A. A ray may also be determined according to a user-selected point on the panoramic image. At step 306, an intersection is determined between the ray and a virtual model. The virtual model may be determined using image content.

In embodiments, the intersection may be used in several ways to navigate between panoramic images. For example, in the switching lanes or walk around embodiments, a second panoramic image may be selected at step 310. In the switching lanes embodiment, the second panoramic image has a location similar to the first panoramic image, but in a different lane. In the walk-around embodiment, the second panoramic image may be selected, for example, by a user. The second panoramic image is oriented to face the intersection at step 316. After step 316, method 300 ends.

In the click-and-go embodiment, a second panoramic image may be such that it is close to the intersection (for example, within a selected or pre-defined distance of the intersection) at step 308, as described with respect to FIG. 2D. At step 314, the second panoramic image may be oriented to face the intersection, or the second panoramic image may be oriented in other directions. For example, the second panoramic image may be oriented in the direction of the street. After step 314, method 300 ends.

FIG. 4 is a flowchart that demonstrates a method 400 for creating a virtual model from image data according to an embodiment of the invention.

Method 400 starts with step 402. In step 402, features of images are identified. In an embodiment, the features are extracted from the images for subsequent comparison. This is described in more detail below with respect to FIGS. 5A-B. In one embodiment, the images that are used are street level panoramic images that are taken from nearby locations to one another along a route of travel.

In step 404, features in neighboring images are matched. In an embodiment, matching features may include constructing a spill tree. This is described in more detail below with respect to FIG. 5C.

In step 406, the locations of features are calculated, for example, as points in three-dimensional space. In an embodiment, points are determined by computing stereo triangulations using pairs of matching features as determined in step 404. How to calculate points in three-dimensional space is described in more detail below with respect to FIGS. 6-7. The result of step 406 is a cloud of points.

In step 408, facade planes are estimated based on the cloud of points calculated in step 406. In an embodiment, step 408 may comprise using an adaptive optimization algorithm or best fit algorithm. In one embodiment, step 408 comprises sweeping a plane, for example, that is aligned to a street as is described below with respect to FIG. 9.

In step 410, street planes are estimated based on the location of streets. These street planes together with the facade planes estimated in step 408 are used to form a virtual model corresponding to objects shown in a plurality of two-dimensional images.

FIGS. 5A, 5B and 5C illustrate an example of how to identify and match features in images according to method 400.

FIG. 5A depicts an image 502 and an image 504. Image 502 and image 504 represent, for example, two photographs of the same building and tree from different perspectives. In an embodiment, image 502 and image 504 may be portions of street level panoramic images. The two images 502 and 504 may be taken from nearby locations, but with different perspectives.

In one embodiment, images 502 and 504 may be taken from a moving vehicle with a rosette of eight cameras attached. The eight cameras take eight images simultaneously from different perspectives. The eight images may be subsequently stitched together to form a panorama. Image 502 may be an unstitched image from a first camera in the eight camera rosette directed perpendicular to the vehicle. Image 504 may be an unstitched image from a second camera adjacent to the first camera taken during a later point in time.

FIG. 5B illustrates image 502 and image 504 with representative features identified/extracted according to step 404 of method 400. Image 502 includes representative features 506, 508, and 512. Image 504 includes representative features 510, 514, and 516. While only six representative features are shown, in practice there may be thousands of features identified and extracted for each image.

In an embodiment, the step of extracting features may include interest point detection and feature description. Interest point detection detects points in an image according to a condition and is preferably reproducible under image variations such as variations in brightness and perspective. The neighborhood of each interest point is a feature. Each feature is represented by a feature descriptor. The feature descriptor is preferably distinctive.

In an example, a Speeded Up Robust Features (SURF) algorithm is used to extract features from neighboring images. The SURF algorithm is described, for example, in Herbert Bay, Tinne Tuytelaars, Luc Van Gool, "SURF: Speeded Up Robust Features", *Proceedings of the Ninth European Conference on Computer Vision*, May 2006. The SURF algorithm includes an interest point detection and feature description scheme. In the SURF algorithm, each feature descriptor includes a vector. In one implementation, the vector may be 128-dimensional. In an example where the images are panoramas taken from street level, the SURF algorithm may extract four to five thousand features in each image, resulting in a feature descriptor file of one to two megabytes in size.

FIG. 5C illustrates extracted features being matched. FIG. 5C depicts a match 520 and Match 522. Match 520 includes feature 512 and feature 514. Match 522 includes feature 506 and feature 516. As represented in FIG. 5C, not every feature in image 502 has a matching feature in image 504 and vice versa. For example, feature 508 in image 502 does not have a matching feature in image 504, because feature 508 shows a portion of a tree that is obscured in image 504. In another example, feature 510 in image 504 does not have a match in image 502, for example, because of an imprecision in the feature identification. The feature identification should be as precise as possible. However, due to variations in lighting, orientation, and other factors, some imprecision is likely. For this reason, a feature matching scheme is required that compensates for the imprecision. An example feature matching scheme is described below.

In an embodiment, each feature such as feature 512 is represented by a feature descriptor. Each feature descriptor includes a 128 dimensional vector. The similarity between a first feature and a second feature may be determined by finding the Euclidean distance between the vector of the first feature descriptor and the vector of the second feature descriptor.

A match for a feature in the first image among the features in the second image may be determined, for example, as follows. First, the nearest neighbor (e.g., in 128-dimensional space) of a feature in the first image is determined from among the features in the second image. Second, the second-nearest neighbor (e.g., in 128 dimensional space) of the feature in the first image is determined from among the features in the second image. Third, a first distance between the feature in the first image and the nearest neighboring feature in the second image is determined, and a second distance between the feature in the first image and the second nearest neighboring feature in the second image is determined. Fourth, a feature similarity ratio is calculated by dividing the first distance by the second distance. If the feature similarity ratio is below a particular threshold, there is a match between the feature in the first image and its nearest neighbor in the second image.

If the feature similarity ratio is too low, not enough matches are determined. If the feature similarity ratio is too high, there are too many false matches. In an embodiment, the feature similarity ratio may be between 0.5 and 0.95 inclusive.

In an embodiment, the nearest neighbor and the second nearest neighbor may be determined by constructing a spill tree of the features in the second image. The spill tree closely approximates the nearest neighbors and efficiently uses processor resources. In an example where the images being compared are panoramic images taken from street level, there may be hundreds of pairs of matched features for each pair of images. For each pair of matched features, a point in three-dimensional space can be determined, for example, using stereo triangulation.

FIGS. 6 and 7 illustrate an example of determining a point in three-dimensional space based on matched features using three-dimensional stereo triangulation. In an embodiment, this technique is used, for example, to implement step 406 of method 400. To determine a point in three-dimensional space corresponding to a pair of matched features, rays are constructed for the pair of matched features and the point is determined based on the intersection of the rays. This is described in more detail below.

FIG. 6 shows an example 600 that illustrates how a ray is formed. As shown in FIG. 6, a ray 606 can be formed by projecting or extending a ray from a camera viewpoint 602 of image 608 through a feature 604 of image 608. In example 600, camera viewpoint 602 corresponds to the focal point of the camera used to take image 608. The distance between image 608 and camera viewpoint 602 is equal to focal length 610.

After a ray for each of the matching features is formed, a point in three-dimensional space may be determined. FIG. 7 illustrates an example 700 depicting how a point is determined.

In example 700, two camera rosettes 702 and 704 are shown. In an embodiment, these two camera rosettes can be the same (e.g., the same camera rosette can be used to take images at different locations and at different points in time). Each camera rosette 702 and 704 includes an image with a matched feature. In example 700, camera rosette 702 includes a feature 706 that is matched to a feature 708 of camera rosette 704. As shown in FIG. 7, a first ray 710 is formed by extending ray 710 from the camera viewpoint of camera rosette 702 through feature 706. Similarly, a second ray 712 is formed by extending ray 712 from the camera viewpoint of camera rosette 704 through feature 708. The intersection of ray 710 and ray 712 is a three-dimensional point 714. In embodiments, for example, due to imprecision in feature identification and matching, rays 710 and 712 may not actually intersect at a point 714. If rays 710 and 712 do not actually intersect, a line segment where the rays are closest can be determined. In these situations, the three-dimensional point 714 used may be the midpoint of the line segment.

In embodiments, as described above, the steps illustrated by examples 600 and 700 are repeated for each pair of matched features to determine a cloud of three-dimensional points.

FIG. 8A shows an example 800 of three-dimensional space that includes a building 806 and a tree 808. Example 800 also includes a street 810. In an embodiment, photographic images of building 806 and tree 808 may be taken from a vehicle moving along street 810. A first photographic image may be taken from a position 802, while a second photographic image may be taken from a position 804.

As described herein, in accordance with an embodiment of the present invention, features are extracted from the first and second images. Matching features are identified, and for each pair of matching features, a three-dimensional point is determined, for example, using stereo triangulation. This results in a cloud of three-dimensional points, such as those illustrated in FIG. 8B. FIG. 8B illustrates an example 850 in which a cloud of three-dimensional points 852 are depicted.

FIGS. 9A, 9B, and 9C illustrate an example of how to determine a facade surface based on a plurality of points in three-dimensional space. This example is merely illustrative and can be used, for example, to implement step 408 of method 400. In other embodiments, the surface may be determined using a best-fit or regression analysis algorithm such as, for example, a least-squares or an adaptive optimization algorithm. Examples of adaptive optimization algorithms include, but are not limited to, a hill-climbing algorithm, a stochastic hill-climbing algorithm, an A-star algorithm, and a genetic algorithm.

FIG. 9A depicts a street 908 and a cloud of three-dimensional points 910. Running parallel to street 908 is a facade plane 902. In operation, facade plane 902 is translated outward on an axis from street 908. At each position moving outward, the number of points within a particular range of facade plane 902 is evaluated. In FIG. 9A, the range is shown by dotted lines 912 and 914. As shown in FIG. 9A, zero points are located between dotted lines 912 and 914.

FIG. 9B shows a facade plane 904 translated outward on an axis from street 908. In FIG. 9B, facade plane 904 translated outward on an axis from street 908. In FIG. 9B, façade plane 904 has been moved outward from the street 908 a greater distance than that of façade plane 902 shown in FIG. 9A. As a result, three points are within the range from façade plane 904.

In an embodiment, if a position for a façade plane (e.g., a position having a specified number of nearby points) is not found, the angle of the façade plane may be varied relative to the street. Accordingly FIG. 9C shows a façade plane 906 that is at a non-parallel angle with respect to street 908. As shown in FIG. 9C, there are five points that are close to façade plane 906.

As described herein, a virtual model according to the present invention is formed from facade planes. The facade planes may be generated according to image content. In an embodiment, the model may also include one or more street planes (e.g., a plane parallel to the street). In an embodiment, a street plane may be calculated based on a known position of a street (e.g., one may know the position of the street relative to the camera used to take the images). The virtual model may be two-dimensional or three-dimensional.

FIG. 10 shows a system 1000 for using a three-dimensional model to navigate within image data according to an embodiment of the invention. As shown in FIG. 10, system 1000 includes a client 1002. Client 1002 communicates with one or more servers 1024, for example, across network(s) 1044. Client 1002 may be a general-purpose computer. Alternatively, client 1002 can be a specialized computing device such as, for example, a mobile telephone. Similarly, server(s) 1024 can be implemented using any computing device capable of serving data to client 1002.

Server 1024 may include a web server. A web server is a software component that responds to a hypertext transfer protocol (HTTP) request with an HTTP reply. As illustrative examples, the web server may be, without limitation, an Apache HTTP Server, an Apache Tomcat, a Microsoft Internet Information Server, a JBoss Application Server, a WebLogic Application Server, or a Sun Java System Web Server. The web server may serve content such as hypertext markup language (HTML), extendable markup language (XML), documents, videos, images, multimedia features, or any combination thereof. This example is strictly illustrative and does not limit the present invention.

Server 1024 may serve map tiles 1014, a program 1016, configuration information 1018, and/or panorama tiles 1020 as discussed below.

Network(s) 1044 can be any network or combination of networks that can carry data communication, and may be referred to herein as a computer network. Network(s) 1044 can include, but is not limited to, a local area network, medium area network, and/or wide area network such as the Internet. Network(s) 1044 can support protocols and technology including, but not limited to, World Wide Web protocols and/or services. Intermediate web servers, gateways, or other servers may be provided between components of system 1000 depending upon a particular application or environment.

Server 1024 is coupled to a panorama database 1028 and model database 1030. Panorama database 1028 stores images. In an example, the images may be photographic images taken from street level. The photographic images taken from the same location may be stitched together to form a panorama. Model database 1030 stores a three-dimensional model corresponding to the images in panorama database 1028. An example of how the three-dimensional model may be generated is discussed in further detail below. Annotation database 1032 stores user-generated annotations.

Each of panorama database 1028, model database 1030, and annotation database 1032 may be implemented on a relational database management system. Examples of relational databases include Oracle, Microsoft SQL Server, and MySQL. These examples are illustrative and are not intended to limit the present invention.

Server 1024 includes a navigation controller 1032. Navigation controller 1032 uses a model in model database 1030 generated from image content to facilitate navigation between panoramas. Navigation controller 1032 receives input from a navigation data 1042. Navigation data 1042 contains data about the present position and orientation and data about the desired next position. For example, in the click-and-go embodiment, navigation data 1042 may contain a first panoramic image and the location in a first panoramic image where the user would like to go. Navigation data 1042 may be, for example, an HTTP request with data encoded as HTTP parameters.

In response to navigation data 1042, navigation controller 1032 determines the new panorama in panorama database 1028 based on the model in model database 1030. Navigation controller 1032 also determines the orientation to display a second panorama. Navigation controller 1032 outputs the new panorama and the orientation in configuration information 1018 and panorama tiles 1020.

Navigation controller 1032 may include a switching lanes controller 1034, a click-and-go controller 1036, and a walkaround controller 1038. Each of switching lanes controller 1034, click-and-go controller 1036, and walk-around controller 1038 responds to navigation data 1042 according to an embodiment of the present invention.

Switching lanes controller 1034 operates according to the switching lanes embodiment of the present invention. In response to navigation data 1042, switching lanes controller 1034 selects a second panoramic image from panorama database 1028. The second panoramic image is close to the location of the first panoramic image, but in a different lane. In an example, the second panoramic image may be the closest panoramic image in panorama database 1028 that exists in a different lane. Switching lanes controller 1034 determines a location in the model in model database 1030 according to the position and orientation of the first panorama in navigation data 1042. In an embodiment, to determine the location, switching lanes controller 1034 extends a ray from the position in the direction of the orientation, as described with respect to FIG. 2A. Switching lanes controller 1034 then determines an orientation of the second panorama, as described with respect to FIG. 2B. Finally, switching lanes controller 1034 returns the second panorama in panorama tiles 1020 and the orientation of the second panorama in configuration information 1018.

Click-and-go controller 1036 operates according to the click-and-go embodiment of the present invention. In response to navigation data 1042, click-and-go controller 1036 selects a second panoramic image from panorama database 1028. Click-and-go controller 1036 selects the second panoramic image based on a location in a first panoramic image from navigation data 1042. The location in the first panoramic image may be determined by a user input, such as a mouse. Click-and-go controller 1036 uses the location in first panoramic image to determine a location in the model in model database 1042, as described with respect to FIG. 2A. Click-and-go controller 1036 then selects a second panoramic image based on the location in the model. The second panoramic image is close to the location in the model, as described with respect to FIG. 2D. In an example, the second panoramic image may have the location such that the location on the model is normal to the street. In another example, the second panoramic image may have the location that is normal to the virtual model. Click-and-go controller 1036 then determines an orientation of the second panorama. The second panorama may be oriented to face the location in the model, or the second panorama may be oriented in the direction of the street. Finally, click-and-go controller 1036 returns the second panorama tiles 1020 and its orientation in configuration information 1018.

Walk-around controller 1038 selects a second panoramic image from panorama database 1028 in response to navigation data 1042. The second panoramic image may be selected, for example, according to a position in navigation data 1042 entered by a user. Walk-around controller 1038 determines a location in the model in model database 1030 according to the position and orientation of the first panorama in navigation data 1042. To determine the location, walk-around controller 1038 extends a ray from the position in the direction of the orientation, as described with respect to FIG. 2A. Walk-around controller 1038 determines an orientation of the second panorama, as described above. Finally, walk-around controller 1038 returns the second panorama in panorama tiles 1020 and the orientation of the second panorama in configuration information 1018.

In an embodiment, client 1002 may contain a mapping service 1006 and a panorama viewer 1008. Each of mapping service 1006 and panorama viewer 1008 may be a stand-alone application or may be executed within a browser 1004. In embodiments, browser 1004 may be Mozilla Firefox or Microsoft Internet Explorer. Panorama viewer 1008, for example, can be executed as a script within browser 1004, as a plug-in within browser 1004, or as a program which executes within a browser plug-in, such as the Adobe (Macromedia) Flash plug-in.

Mapping service 1006 displays a visual representation of a map, for example, as a viewport into a grid of map tiles. Mapping system 1006 is implemented using a combination of markup and scripting elements, for example, using HTML and Javascript. As the viewport is moved, mapping service 1006 requests additional map tiles 1014 from server(s) 1024, assuming the requested map tiles have not already been cached in local cache memory. Notably, the server(s) which serve map tiles 1014 can be the same or different server(s) from the server(s) which serve panorama tiles 1020, configuration information 1018 or the other data involved herein.

In an embodiment, mapping service 1006 can request that browser 1004 proceed to download a program 1016 for a panorama viewer 1008 from server(s) 1024 and to instantiate any plug-in necessary to run program 1016. Program 1016 may be a Flash file or some other form of executable content. Panorama viewer 1008 executes and operates according to program 1016.

Panorama viewer 1008 requests configuration information 1018 from server(s) 1024. The configuration information includes meta-information about a panorama to be loaded, including information on links within the panorama to other panoramas. In an embodiment, the configuration information is presented in a form such as the Extensible Markup Language (XML). Panorama viewer 1008 retrieves visual assets 1020 for the panorama, for example, in the form of panoramic images or in the form of panoramic image tiles. In another embodiment, the visual assets include the configuration information in the relevant file format. Panorama viewer 1008 presents a visual representation on the client display of the panorama and additional user interface elements, as generated from configuration information 1018 and visual assets 1020. As a user interacts with an input device to manipulate the visual representation of the panorama, panorama viewer 1008 updates the visual representation and proceeds to download additional configuration information and visual assets as needed.

Each of browser 1004, mapping service 1006, and panorama viewer 1008 may be implemented in hardware, software, firmware or any combination thereof.

FIG. 11 shows a system 1100 for creating a virtual model from image data according to an embodiment of the invention. System 1100 includes panorama database 1028 and model database 1030 each coupled to a processing pipeline server 1124. Processing pipeline server 1124 may be any computing device. Example computing devices include, but are not limited to, a computer, a workstation, a distributed computing system, an embedded system, a stand-alone electronic device, a networked device, a mobile device, a rack server, a television, or other type of computing system.

Processing pipeline server 1124 includes a feature extractor 1116, a feature matcher 1118, a point calculator 1120, and a surface estimator 1122. Each of feature extractor 1116, feature matcher 1118, point calculator 1120, and surface estimator 1122 may be implemented in hardware, software, firmware or any combination thereof.

Feature extractor 1116 selects images 1102 from panorama database 1028. In an embodiment, images 1102 may include two images which are street level unstitched panoramic images. The two images may be taken from nearby location to one another, but from different perspectives. In an embodiment, the images are taken from a moving vehicle with a rosette of eight cameras attached. The eight cameras take eight images simultaneously from different perspectives. The eight images may be subsequently stitched together to form a panorama. The first image may be an unstitched image from a first camera in the eight camera rosette. The second image may be an unstitched image from a second camera adjacent to the first camera taken during a later point in time.

Feature extractor 1116 extracts features from images 1102. In an embodiment, feature extractor 1116 may perform more than one function such as, for example, interest point detection and feature description. Interest point detection detects points in an image according to conditions and is preferably reproducible under image variations such as variations in brightness and perspective. The neighborhood of each interest point is then described as a feature. These features are represented by feature descriptors. The feature descriptors are preferably distinctive.

In an example, a Speeded Up Robust Features (SURF) algorithm may be used to extract features from the images. The SURF algorithm includes an interest point detection and feature description scheme. In the SURF algorithm, each feature descriptor includes a vector. In one implementation, the vector may be 128-dimensional. In an example where the images are panoramas taken from street level, the SURF algorithm may extract four to five thousand features in each image, resulting in a feature descriptor file 1104 of one to two megabytes in size.

Feature matcher 1118 uses each feature descriptor file 1104 to match features in the two images. In an example, each feature is represented by a feature descriptor in feature descriptor file 1104. Each feature descriptor includes a 128-dimensional vector. The similarity between a first feature and a second feature may be determined by finding the Euclidean distance between the vector of the first feature and the vector of the second feature.

A match for a feature in the first image among the features in the second image may be determined as follows. First, feature matcher 1118 determines the nearest neighbor (e.g., in 118-dimensional space) of the feature in the first image determined from among the features in the second image. Second, feature matcher 1118 determines the second-nearest neighbor of the feature in the first image determined from among the features in the second image. Third, feature matcher 1118 determines a first distance between the feature in the first image and the nearest neighboring feature in the second image, and feature matcher 1118 determines a second distance between the feature in the first image and the second nearest neighboring feature in the second image. Fourth, feature matcher 1118 calculates a feature similarity ratio by dividing the first distance by the second distance. If the feature similarity ratio is below a particular threshold, there is a match between the feature in the first image and its nearest neighbor in the second image.

Feature matcher 1118 may determine the nearest neighbor and second nearest neighbor, for example, by constructing a spill tree.

If the feature similarity ratio is too low, feature matcher 1118 may not determine enough matches. If the feature similarity ratio is too high, feature matcher 1118 may determine too many false matches. In an embodiment, the feature similarity ratio may be between 0.5 and 0.95 inclusive. In examples where the images are panoramas taken from street level, there may be several hundred matched features. The matched features are sent to point calculator 1120 as matched features 1106.

Point calculator 1120 determines a point in three-dimensional space for each pair of matched features 1106. To determine a point in three-dimensional space, a ray is formed or determined for each feature, and the point is determined based on the intersection of the rays for the features. In an embodiment, if the rays do not intersect, the point is determined based on the midpoint of the shortest line segment connecting the two rays. The output of point calculator 1120 is a cloud of three-dimensional points 1108 (e.g., one point for each pair of matched features).

Surface estimator 1122 determines a facade plane based on the cloud of points 1108. Surface estimator 1122 may determine the facade plane by using a best-fit or regression analysis algorithm such as, for example, a least-squares or an adaptive optimization algorithm. Examples of adaptive optimization algorithms include, but are not limited to, a hill-climbing algorithm, a stochastic hill-climbing algorithm, an A-star algorithm, and a genetic algorithm. Alternatively, surface estimator 1122 may determine the facade surface by translating a plane to determine the best position of the plane along an axis, as described above with respect to FIGS. 9A-C.

Surface estimator 1122 may also determine more or more street planes. The street planes and the facade planes together form surface planes 1110. Surface estimator 1122 stores surface planes 1110 in model database 1030.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The invention claimed is:

1. A computer-implemented method for image navigation, the method comprising:
   providing, by one or more computing devices, a first image including a plurality of avatars, each avatar corresponding to an object within the first image, the first image being geo-coded to a first one of the plurality of avatars;
   determining, by the one or more computing devices, an orientation of at least one of the plurality of avatars to a point of interest within the first image;
   determining, by the one or more computing devices, a viewport of the first avatar in accordance with the orientation of the first avatar to the point of interest within the first image, the point of interest within the first image being included within the viewport of the first avatar, the viewport presenting only a portion of the first image;
   in response to received user input, selecting by the one or more computing devices a second image, the second image including at least a second one of the avatars from the first image and the point of interest from the first image;
   determining, by the one or more computing devices, a viewport of the second avatar in the second image, the viewport of the second avatar in the second image including the point of interest from the first image, the viewport of the second avatar in the second image presenting only a portion of the second image; and
   orienting, by the one or more computing devices, the second image to align the viewpoint of the second avatar in the second image with the point of interest in order to provide navigation between the first image and the second image.

2. The computer-implemented method of claim 1, wherein the first image and the second image comprise parts of a panoramic image, and a portion of the panoramic image displayed in the second avatar's viewport contains a set of content that corresponds to a set of content displayed in the viewport of the first avatar.

3. The computer-implemented method of claim 1, further comprising generating a transition between the first avatar and another one of the plurality of avatars, the transition including at least one intermediate image for avatar positions between the first avatar and the other avatar.

4. The computer-implemented method of claim 3, further comprising orienting the at least one intermediate image to face the point of interest.

5. The computer-implemented method of claim 1, wherein:
the first image corresponds to a first geolocation and the second image corresponds to a second geolocation; and
a position of the second avatar is a same position as a closest available panoramic image to the point of interest.

6. The computer-implemented method of claim 1, wherein the point of interest is determined in response to a user selection in the first image.

7. The computer-implemented method of claim 1, wherein the one or more processors use a virtual model to navigate between the first and second images.

8. The computer-implemented method of claim 1, wherein the first and second avatars are associated with objects located on different lanes of a street.

9. The computer-implemented method of claim 1, wherein the first and second images are of nearby locations having different perspectives.

10. The computer-implemented method of claim 1, wherein at least one of the first and second images comprises a photographic image taken from a street level.

11. The computer-implemented method of claim 1, wherein at least some features of the first image are not included in the second image.

12. The computer-implemented method of claim 1, wherein the first and second images were captured by a same camera.

13. The computer-implemented method of claim 12, wherein the first and second images were captured by the same camera at different points in time.

14. A system, comprising:
a memory; and
one or more one or more computing devices, operatively coupled to the memory, configured to execute a navigation controller that:
provides a first image including a plurality of avatars, each avatar corresponding to an object within the first image, the first image being geo-coded to a first one of the plurality of avatars;
determines an orientation of at least one of the plurality of avatars to a point of interest within the first image;
determines a viewport of the first avatar in accordance with the orientation of the first avatar to the point of interest within the first image, the point of interest within the first image being included within the viewport of the first avatar, the viewport presenting only a portion of the first image;
in response to received user input, selects a second image, the second image including at least a second one of the avatars from the first image and the point of interest from the first image;
determines a viewport of the second avatar in the second image, the viewport of the second avatar in the second image including the point of interest from the first image, the viewport of the second avatar in the second image presenting only a portion of the second image; and
orients the second image to align the viewpoint of the second avatar in the second image with the point of interest in order to provide navigation between the first image and the second image.

15. The system of claim 14, wherein the navigation controller is operative to generate a transition between the first avatar and another one of the plurality of avatars, the transition including at least one intermediate image for avatar positions between the first avatar and the other avatar.

16. The system claim 15, wherein the navigation controller is operative to orient the at least one intermediate image to face the point of interest.

17. The system of claim 14, wherein the point of interest is determined in response to a user selection in the first image.

18. A non-transitory computer-readable medium storing computer program instructions, which, when executed by one or more computing devices, cause the one or more computing devices to perform a method comprising:
providing a first image including a plurality of avatars, each avatar corresponding to an object within the first image, the first image being geo-coded to a first one of the plurality of avatars;
determining an orientation of at least one of the plurality of avatars to a point of interest within the first image;
determining a viewport of the first avatar in accordance with the orientation of the first avatar to the point of interest within the first image, the point of interest within the first image being included within the viewport of the first avatar, the viewport presenting only a portion of the first image;
in response to received user input, selecting a second image, the second image including at least a second one of the avatars from the first image and the point of interest from the first image;
determining a viewport of the second avatar in the second image, the viewport of the second avatar in the second image including the point of interest from the first image, the viewport of the second avatar in the second image presenting only a portion of the second image; and
orienting the second image to align the viewpoint of the second avatar in the second image with the point of interest in order to provide navigation between the first image and the second image.

19. The non-transitory computer-readable medium of claim 18, wherein the method further comprises generating a transition between the first avatar and another one of the plurality of avatars, the transition including at least one intermediate image for avatar positions between the first avatar and the other avatar.

20. The non-transitory computer-readable medium of claim 19, wherein the method further comprises orienting the at least one intermediate image to face the point of interest.

* * * * *